No. 726,642. PATENTED APR. 28, 1903.
R. E. CLARKE.
AGRICULTURAL IMPLEMENT.
APPLICATION FILED JUNE 14, 1902.
NO MODEL.

Witnesses

Inventor
Robert E. Clarke.
By
R.S.&N.Lacey
Attorneys

THE NORRIS PETERS CO., PHOTO-LITHO., WASHINGTON, D. C.

UNITED STATES PATENT OFFICE.

ROBERT E. CLARKE, OF LANGSTON, OKLAHOMA TERRITORY.

AGRICULTURAL IMPLEMENT.

SPECIFICATION forming part of Letters Patent No. 726,642, dated April 28, 1903.

Application filed June 14, 1902. Serial No. 111,710. (No model.)

*To all whom it may concern:*

Be it known that I, ROBERT E. CLARKE, a citizen of the United States, residing at Langston, in the county of Logan and Territory of Oklahoma, have invented certain new and useful Improvements in Agricultural Implements, of which the following is a specification.

This invention is an agricultural implement consisting, essentially, of a hoe and rake, the members adapted to be interchangeably secured to the handle according to the character of the work desired to be done.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
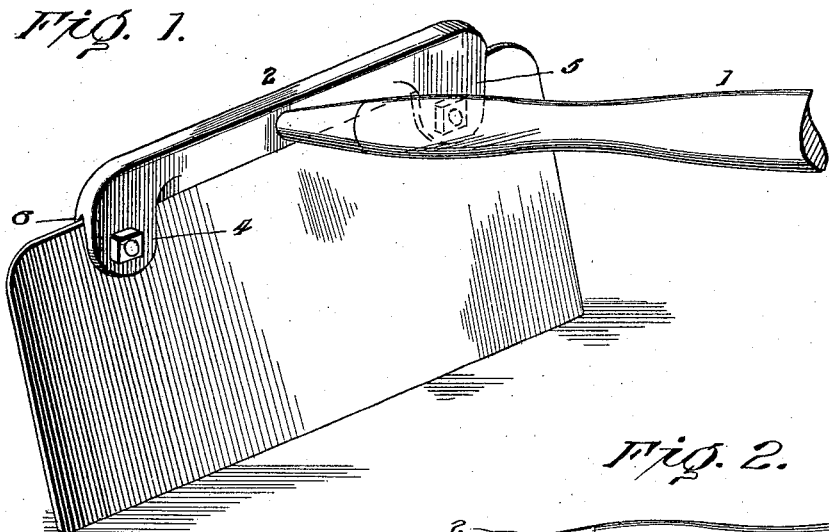
Figure 2:
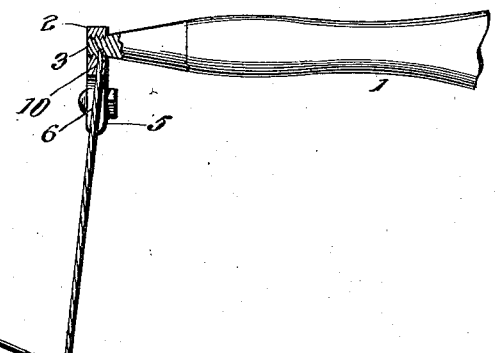
Figure 3:
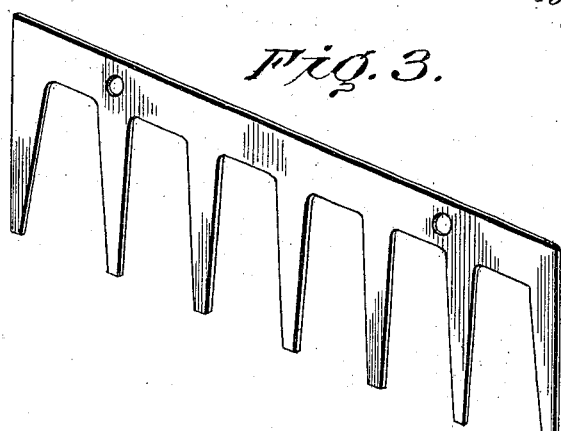
Figure 4:
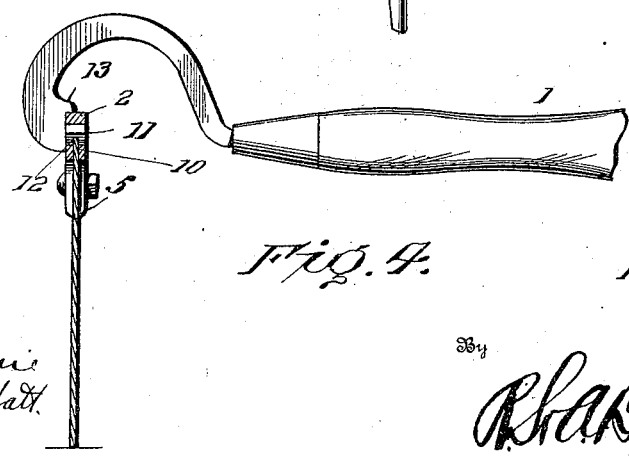

Figure 1 is a perspective view of an agricultural implement embodying the invention. Fig. 2 is a vertical sectional view. Fig. 3 is a detail perspective view of a rake-head. Fig. 4 is a vertical section of a modification.

Corresponding and like parts are referred to in the following description and indicated in all the views of the drawings by the same reference characters.

The implement provides simplicity of construction not heretofore attained, the novelty resting in the unique form and adaptation of the head.

The handle 1 is of any suitable form and is connected to the head 2, preferably by the screw-head 3, which passes into a hole centrally disposed upon the head. The said handle may, however, be secured in the usual manner to the shank of the head, as shown in the modification, which will be more fully described hereinafter.

The head 2 is of approximately U shape, having the arms 4 and 5. The said arms are formed with the main portion of the head, but are somewhat thicker in cross-section than the said body portion, this being requisite to lend strength and rigidity to the device. Open slots 6 are located on the arms to receive the upper portion of the hoe or rake in the usual manner. A groove 10, forming an extension of the slotted portions of the arms 4 and 5, is formed upon the under side of the head. This groove affords additional strength to the implement. Holes in the arms 4 and 5 are adapted to receive bolts or like fastening means, which, passing through corresponding holes in the blade of the hoe or rake, form the means of securement of the same to the handle. The slots 6 are inclined, so that when the detachable screw-handle is used the head may be reversed and the handle attached from either side. By inclining the slots and adapting the blade so that a different pitch of same may be obtained it will be seen that the handle may be used elevated or lowered as desired, according to the side from which the handle is attached. The advantages of this construction are obvious, affording a means of relief to the user after the implement has been handled in one position for a long time. Also it is better adapted for different kinds of work, because of this reversible feature. It is very convenient when the rake member is substituted to have the handle more elevated than when the hoe-blade is being used.

It is obvious that when it is desired to use either the rake or hoe it is only necessary to turn the nuts, which are preferably employed in connection with the bolts, so that same may be quickly and readily removed and the blade of the implement which it is desired to operate substituted.

In the modification showing the curved shank a peculiar construction is employed to secure same to the head. A lug 11 is formed upon the lower extremity of the shank, said lug extending transversely through the head. The blade of the hoe engages in a notch 12 upon the said lug after same has been inserted into the hole in the head, which is preferably square in cross-section, and same is held securely in position thereby. The hole in the head in which the lug 11 passes is made square to prevent any rotatory movement of the shank, and a shoulder 13 upon the shank near by the lug additionally serves to prevent such movement.

As shown in Fig. 2, casual displacement of the handle from the head is prevented by the upper edge of the blade entering a notch in the part 3, threaded into the head 2.

This invention is susceptible of varied modifications of structure which, apparent to those versed in this class of invention, will be included in the scope thereof.

Having thus described the invention, what is claimed as new is—

1. In an implement of the class described, a head having integral lateral arms extending from the end portions thereof and provided with an opening, open slots in the aforesaid arms, a shank having a portion fitted into the opening of the head and provided with a lateral notch and a blade secured to the head, the upper portion of said blade entering the slots of the lateral arms and the edge portion of the blade entering into the notch in the shank, substantially as specified.

2. In an implement of the character described, a handle, a head of approximately U form, slots located in the arms of the head to receive the attaching-blade, means whereby the pitch of the blade may be changed, and means for detachably securing the blade within the said head, substantially as set forth.

3. In an implement of the character described, a detachable handle, a head having right-angularly-disposed arms, inclined open slots in the said arms, whereby the pitch of the blade secured therein may be changed, and means for securing the blade to the head, substantially as specified.

4. In an implement of the character described, a handle, a head having right-angularly-disposed arms, inclined open slots in said arms, whereby the pitch of the blade secured therein may be changed, the under side of the head being longitudinally grooved, said groove extending from the slots in the arms and adapted to receive the upper portion of the blade inserted in the said head, substantially as set forth.

In testimony whereof I affix my signature in presence of two witnesses.

ROBERT E. CLARKE. [L. S.]

Witnesses:
   J. W. McELROY,
   FRANCES McELROY.